United States Patent Office 2,893,330
Patented July 7, 1959

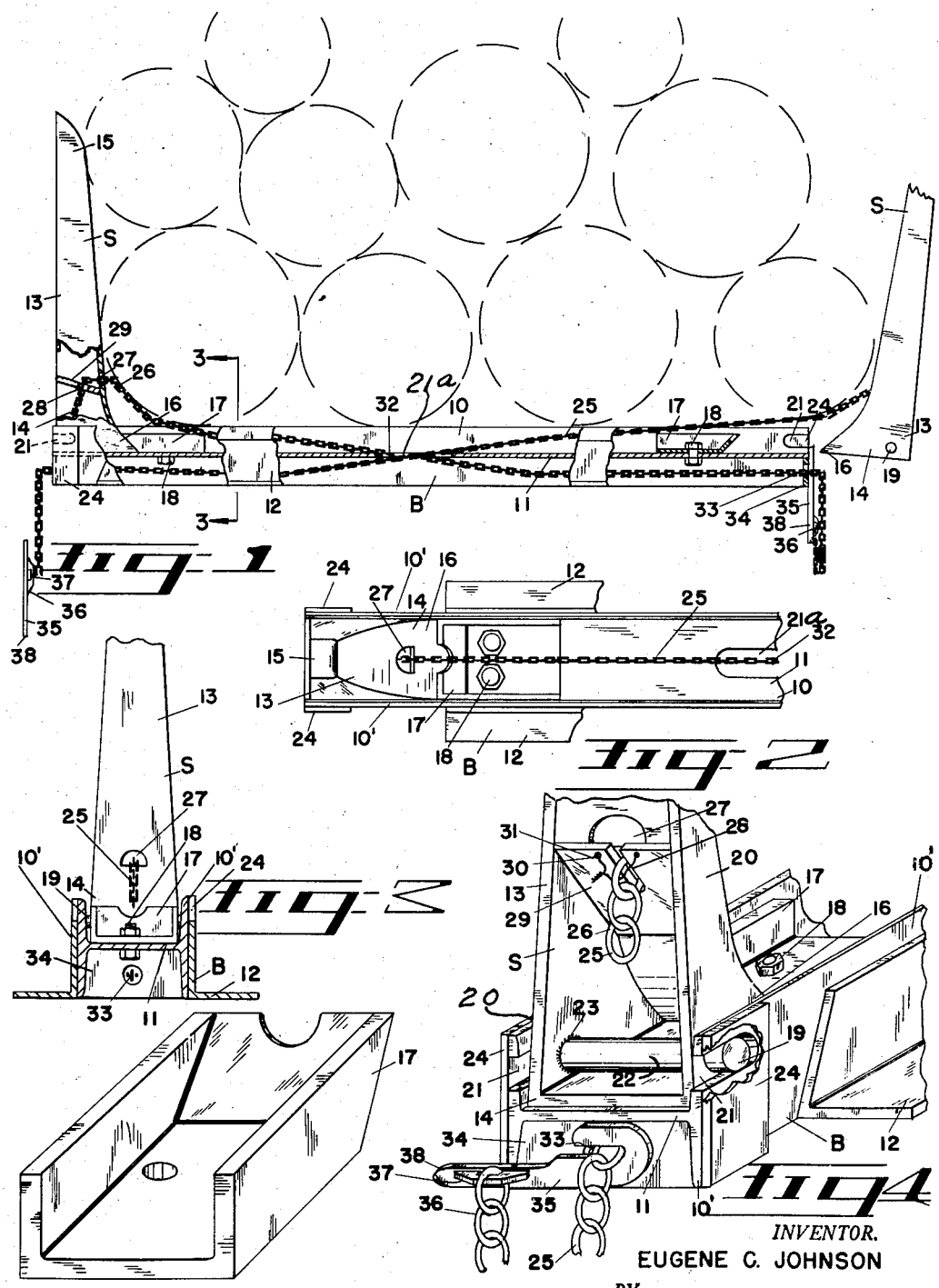

2,893,330

STAKES FOR LOG BUNKS

Eugene C. Johnson, Albany, Oreg.

Application July 25, 1956, Serial No. 600,066

2 Claims. (Cl. 105—382)

The present invention relates to stakes for log bunks. The primary object of the invention is to combine a log holding stake with a log bunk in such a manner as to be able to completely free the stake from the bunk when the load of logs is dumped.

Another object of the invention is to mount the stake to the bunk in such a manner that if struck by a log in loading or unloading it will not distort, twist or bend the stake relative to its mounting within the bunk.

A further object of the invention is to provide a stake that will attach and be held to the bunk so that it will have a limited freedom or movement to conform to the twist of the load in regards to the bunk, preventing the stake from being deformed or otherwise damaged.

A still further object of the invention is to provide a stake that can be released by an operator from the opposite side from which the load is dumped, thereby providing for greater safety in the dumping of the load of logs.

Another object of the invention is to provide a stake of the class described above which is inexpensive to manufacture, easy to use, and which can be installed on existing log bunks with a minimum of cost.

Other objects and advantages will become apparent in the following specification when considered in the light of the attached drawings, in which:

Figure 1 is a side view of a log bunk, partially broken away for convenience of illustration. In this view the logs are indicated by broken lines and one of the stakes having been released in the dumping of the load of logs.

Figure 2 is an enlarged fragmentary top plan view.

Figure 3 is an enlarged fragmentary sectional view, taken on the line 3—3 of Figure 1, looking in the direction indicated.

Figure 4 is a fragmentary perspective view of the stake associated with the bunk, and illustrated in holding position.

Figure 5 is a perspective view of the removable hold down clamp for holding the toe of the stake in load carrying position.

Referring now to the drawings in detail wherein like reference characters indicate like parts throughout the several figures, the log bunk, which forms a log support, is indicated by the reference character B. The bunk B consists of an eye beam 10 having the spaced generally parallel upright side walls thereof integrally connected by a generally horizontal web 11. The bunk B may be reinforced by angle bars 12 throughout most of their length.

A stake S consists of the upright hollow elongated body member 13, being wider at the base 14 than at the top 15. The stake S has an inwardly extending wedge toe 16 forming part of the lower ends 14. The toes 16 engage under the respective beveled ends of the inverted wedge hold down clamps 17, positioned adjacent to but spaced from the opposite ends of the bunk B and secured to the web 11 by bolts 18. The hold down clamps 17 would not have to be removable, and they could be formed integral with the beam 10.

A pivot shaft 19 extends beyond the sides 20 of each of the stakes S and are adapted to enter into the notches or grooves 21 formed on the outer ends of the beam 10. The pivot shafts 19 may form part of the transverse shaft 22, which is fixedly secured to the stake S, as for instance, by welding 23. Reinforcing plates 24 may be provided for strengthening the notches or grooves 21.

Binding chains 25 have one of their ends 26 passing through the opening 27 of the stake S and entered into the notch 28 formed within the web 29 of the stake S. The chains 25 are held in this notch 28 by gravity and assisted by the loop of wire 30, which passes through the holes 31 within the web 29 and around the end of the chain 25.

The opposite end 32 of the chain 25 passes down through the opening or slot 21a of the web 11 of the bunk B and through the opening 33 formed in the end plate 34, which is welded to the end of the beam 10.

A fid hook 35 hooks over one of the lengths of the chain, as best illustrated in Figure 4. The hook 35 is attached to the end 36 of the chain 25 by the ear 37 forming part of the fid hook 35. By positioning the ear 37 outwardly from the handle 38 of the hook 35, the handle end of the hook 35 can be rotated without the end of the chain 36 interfering in its rotation against the end plate 34. The object of rotating the fid hook 35 will be later described.

The operation of this new and improved log stake S will now be described. The stake S is held in an upright position and the toe 16 entered between the sides 10' of the bunk B, the toe 16 coming under the bevelled end of the hold down clamp 17, both stakes S are brought into place in this manner. The binding chains 25 are entered through the openings 27 of the stakes S and anchored within the slot 28 and bound in place by the holding wire 30. The opposite end of the chains 25 are brought down through the slot 21a, located within the web 11 of the bunk B, then threaded through the openings 33 of the end plates 34, the fid hood 35 is then hooked over one of the links of chain 25 and rotated preferably to the right. This twists the chain 25 and tightens the same against the stakes S, the friction between the fid hook 35 and the end plate 34 will hold the hook 35 in place after the same has been tightened.

When the logs are loaded onto the bunk B they will put a pressure on the binding chains 25, further holding the stakes S in place. The outward pressure of the logs will be taken by the toes 16 underneath the clamps 17, so that the chains 25 are not responsible for holding all of the outward exerted pressure of the load of logs towards the stake S.

When it is desired to release the load of logs, the operator will grasp the handle 38 of the fid hook 35, rotate the same to the left or in the opposite direction to that rotated to tighten the chain. This will allow the hook 35 to be easily removed from the chain 25, which in turn will allow the weight of the logs to push the toe 16 of the stake S from under the clamp 17 and the stake S in general from out between the sides 10' of the bunk B, as illustrated on the right in Figure 1.

The fid hook 35 may be released by striking the end of the handle 38 with a solid object in the case where the twisting of the same to release the chain 25 is not sufficient.

It will be noted, due to the structure of this new and improved stake S and bunk combination, that the stake S can be relatively free to move or twist to conform to the movement of the load of logs without binding or twisting the stake S out of shape, and it can be readily understood how the same may be adapted to already existing log bunks now in use by a simple alteration of the bunk. It also makes it possible to use the type of block that is not considered a stake S, but merely used as a wedge to prevent the log from rolling off the bunk.

Having thus described the preferred embodiment of the invention, it should be understood that numerous structural modifications and adaptations may be resorted to without departing from the scope of the appended claims.

What is claimed is:

1. A log bunk comprising an elongated generally horizontal log support having opposed ends and a horizontal upper surface, a stake supported on said upper surface adjacent each end of said log support and extending upwardly therefrom, an inverted wedge hold down clamp secured to the upper surface of said log support adjacent each end thereof with the wedge portion of said clamp extending toward the adjacent end of said log support, a wedge toe formed on the lower end of each of said stakes releasably engaging under said inverted wedge hold down clamp, means on said log support for guiding each of said stakes for movement in a horizontal sliding path, and a chain connected to said stake adjacent the lower end thereof with the opposite end of said chain releasably connected to the end of said log support opposite said last named stake restraining said last named stake against movement away from said clamp.

2. A log bunk comprising an elongated generally horizontal log support including a pair of spaced parallel upstanding side walls and a horizontal upper surface, said support having a pair of opposed ends, an upright stake supported on said upper surface adjacent each end of said log support and extending upwardly therefrom, a horizontal shaft extending through and secured to the lower end of said stake and projecting beyond the opposite sides of said stake, said shaft extending substantially perpendicularly to said log support, said support having a pair of horizontal slots at each end thereof with one of said slots being formed in each end portion of each of said side walls and opening through the end of each of said side walls, said shaft having the opposite ends thereof slidably engaged in one pair of said slots, a pair of inverted wedge hold down clamps secured respectively to the upper surface of said log support adjacent to but spaced from the respective opposite ends thereof, said hold down clamps each having the end thereof toward the adjacent end of said log support formed with an end wall sloping upwardly and toward the adjacent end of said log support, a wedge toe formed on the lower end of each of said stakes and having a wall formed thereon sloping downwardly and away from said stake releasably engaging with the sloping wall of a respective clamp, and a pair of chains each having one end secured to the lower end of a respective one of said stakes and the opposite end detachably secured to the end of said support remote from said last mentioned stake.

References Cited in the file of this patent
UNITED STATES PATENTS

| | | |
|---|---|---|
| 998,084 | George | July 18, 1911 |
| 1,087,826 | Purcell et al. | Feb. 17, 1914 |
| 1,182,942 | Thompson | May 16, 1916 |
| 1,324,402 | Markkula | Dec. 9, 1919 |
| 1,852,448 | Chriswell | Apr. 5, 1932 |
| 2,082,350 | Markkula | June 1, 1937 |

FOREIGN PATENTS

| | | |
|---|---|---|
| 360,983 | Germany | Oct. 9, 1922 |